(12) United States Patent
Brumm et al.

(10) Patent No.: US 7,058,045 B2
(45) Date of Patent: Jun. 6, 2006

(54) METHOD AND NETWORK ELEMENT FOR PROCESSING SIGNALING DATA AND FOR CONTROLLING CONNECTIONS OF SUBSCRIBERS OF A PACKET-SWITCHING COMMUNICATIONS NETWORK

(75) Inventors: Thomas Brumm, Gauting-Koenigswiesen (DE); Udo Klotz, Neuried (DE); Norbert Loebig, Darmstadt (DE); Walter Zinkl, Vienna (DE); Patrick Kleiner, Munich (DE); Robert Kresnik, Slovenska Bistrica (SI); Irena Romanski, Egling (DE)

(73) Assignee: Siemens Aktiengesellschaft, Munich (DE)

( * ) Notice: Subject to any disclaimer, the term of this patent is extended or adjusted under 35 U.S.C. 154(b) by 722 days.

(21) Appl. No.: 09/827,501

(22) Filed: Apr. 6, 2001

(65) Prior Publication Data
US 2002/0071425 A1 Jun. 13, 2002

(30) Foreign Application Priority Data
Apr. 6, 2000 (DE) ............................... 100 17 228

(51) Int. Cl.
H04L 12/66 (2006.01)

(52) U.S. Cl. ...................................... 370/352; 370/467
(58) Field of Classification Search ................ 370/352, 370/353, 354, 355, 356, 401, 463, 466, 467, 370/420, 423
See application file for complete search history.

(56) References Cited

U.S. PATENT DOCUMENTS

| | | | | |
|---|---|---|---|---|
| 6,137,839 A * | 10/2000 | Mannering et al. | ......... | 375/260 |
| 6,181,710 B1 * | 1/2001 | Cooper et al. | .............. | 370/467 |
| 6,285,671 B1 * | 9/2001 | Bossemeyer et al. | ....... | 370/352 |
| 6,301,609 B1 * | 10/2001 | Aravamudan et al. | ...... | 709/207 |
| 6,351,452 B1 * | 2/2002 | Koenig et al. | .............. | 370/217 |
| 6,507,577 B1 * | 1/2003 | Mauger et al. | ............. | 370/356 |

FOREIGN PATENT DOCUMENTS

EP 0 966 145 12/1999

OTHER PUBLICATIONS

Skaperda: "EWSD Heute-Gewachsene Leistungsvielfalt", Telecom Report No. 11, pp. 200-203.
Lakshmi-Ratan: "The Lucent Technologies Softswitch-Realizing the Promise of Convergence", pp. 174-195.

* cited by examiner

*Primary Examiner*—Kwang Bin Yao
(74) *Attorney, Agent, or Firm*—Bell, Boyd & Lloyd LLC (57) ABSTRACT

A method and a network element for processing signaling data and for controlling connections of subscribers of a packet-switching communications network. A network element actuates a concentrator interface using at least one connecting unit and makes resources available to it. Signaling data for performing subscriber signaling of a subscriber of the packet-switching communications network is transmitted between at least one packet control unit and the connecting unit via a message control system of the network element. The packet control unit converts the signaling data of the network element into signaling packets of the packet-switching communications network and vice versa. The signaling packets are transmitted between the network element and the subscriber.

26 Claims, 5 Drawing Sheets

METHOD AND NETWORK ELEMENT FOR PROCESSING SIGNALING DATA AND FOR CONTROLLING CONNECTIONS OF SUBSCRIBERS OF A PACKET-SWITCHING COMMUNICATIONS NETWORK

BACKGROUND OF THE INVENTION

The present invention relates to both a method and a network element for processing signaling data and for controlling connections of subscribers in packet-switching communications networks. A subscriber is connected to a packet-switching communications network. To perform subscriber signaling, signaling information is transmitted between a switching entity and the subscriber.

Figure 1:
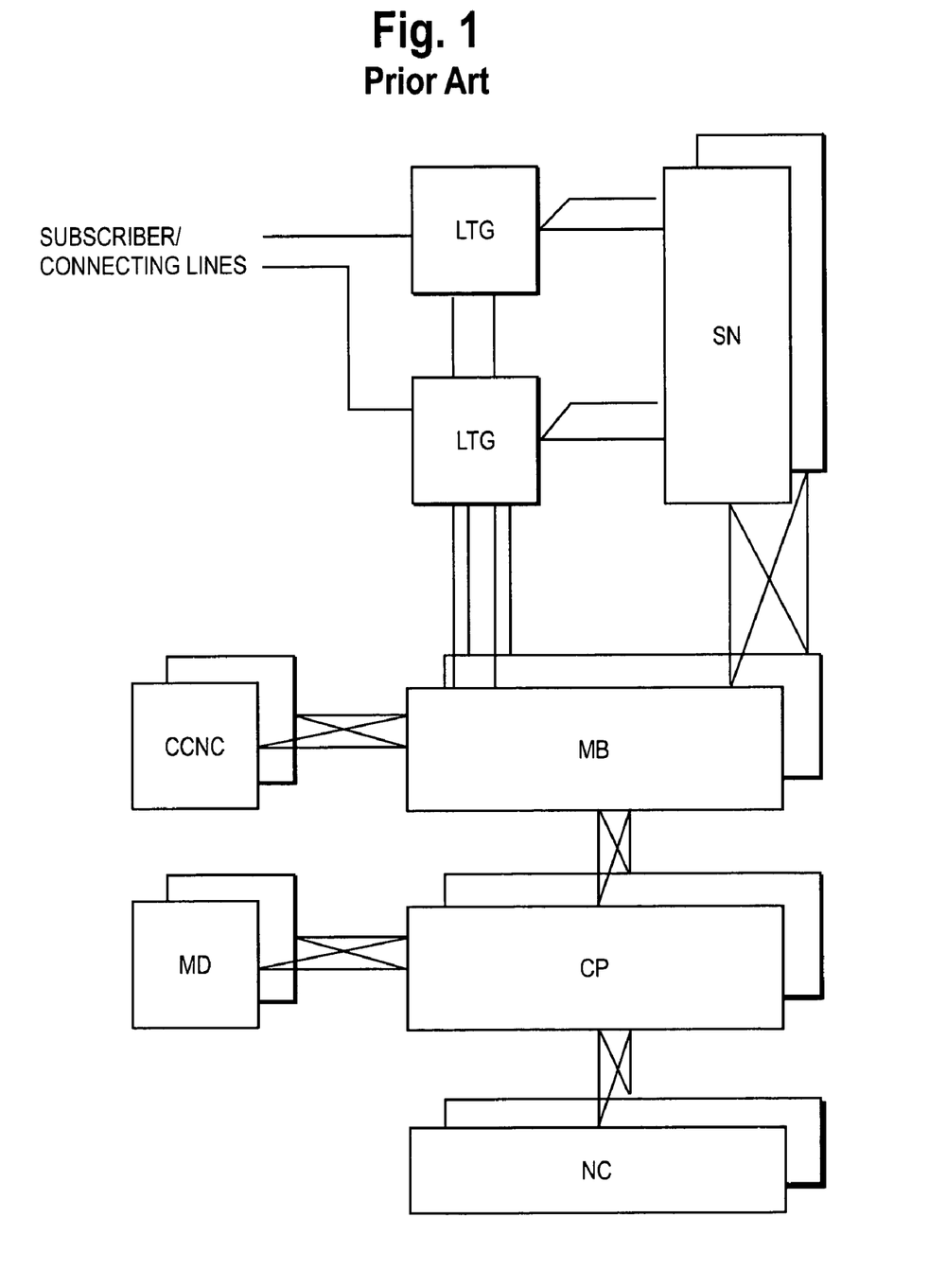
FIG. 1 shows a typical architecture of a known switching system with non-redundant trunk line groups.

In the prior art, conventional telecommunications networks have switching nodes; i.e., switching offices or switching systems. These switching nodes include line trunk groups, what is known as peripheral devices, for connecting subscribers or lines, a central computer platform, a message router device and further central units; for example, a switching network, protocol terminating devices of the No. 7 signaling system, background memories and operator devices. A block circuit diagram of such a switching node is illustrated in FIG. 1.

The line trunk groups fulfill essential switching functions which are tied to the voice channels of the line trunk groups. For this reason they contain switching, operating and administrative programs as well as the data information associated with the line trunk groups, such as connection position, signaling, user service classes, call numbers, individual characteristics of connecting lines and subscriber lines, as well as the upgrade level and the configuration of the line trunk group.

The central computer platform is used to coordinate control of the connection setup and of the connection release, as well as the reaction to administrative and fault-induced configuration changes. Peripheral devices are connected to one another and to the common computer platform via the telecommunications system. The further central system components provide the switching system of the switching node with special functions; for example, for connecting through voice channels, for processing signaling protocols, for implementing operator interfaces or for storing mass data. The central components of the switching system are of redundant configuration, i.e. doubled, for example, for reasons of protection against failures. If no increased requirements are made of the switching availability of the subscribers or of the connecting lines of the switching system, the line trunk groups are not of redundant design. However, if stable connections are to be made available above and beyond the failure of one line trunk group, the line trunk groups are also of redundant configuration.

Conventional subscribers of a switching system are connected directly and physically to the line trunk groups or they are connected physically to a subscriber concentrator which is mounted upstream of the line trunk groups and which is connected to the switching office using standardized concentrator interfaces, for example an interface of the V5.X interface series or a TR303 interface, or manufacturer-specific concentrator interfaces, for example a V93 interface or a V95 interface. For voice-channel related connections, signaling data for subscriber signaling and user data is routed via the switching office. The user data is connected through here with a data transmission rate of 64 kbit/s or with a multiple of this data transmission rate. The signaling data for subscriber signaling is transmitted bidirectionally between the subscriber concentrator at the one end and a switching office at the other end for subscriber groups, i.e. jointly for a number of subscribers, using a communications channel according to the definition of the concentrator interface used. In addition to the signaling, end-to-end packet data (user-to-user signaling) or packet data to be passed on to a packet handler interface can be routed in the signaling path in addition to signaling.

In the case of a connection between subscribers of a packet network (for example, voice over packet), the user data is usually not routed to a switching office. The routing of a user data to a switching office is necessary only if a subscriber which is involved in the connection is connected to a conventional circuit-switching communications network, for example a communications network with time-division multiplexing technology, and as a result cannot be reached directly via the packet network. In such a case, it is necessary to convert the user data in order to adapt it to the transmission technology used in the different communications networks. Such a conversion is necessary, in particular, at a junction from a communications network with packet transmission technology with a communications network with time-division multiplexing transmission technology (TDM technology). This conversion is carried out both when transmitting data of the communications network with time-division multiplexing transmission technology to the communications network with packet transmission technology and when transmitting data of the communications network with packet transmission technology to the communications network with time-division multiplexing transmission technology. When there is a telephone connection between two subscribers of a packet network, the user data of the connection is probably exchanged directly via the packet network. In this case, the user data generally is not routed via the switching office using converters or gateways.

In terms of their signaling, the subscribers in the packet network are not associated with a subscriber concentrator or a concentrator interface of a switching office of the circuit-switching communications network via hardware. The subscribers have neither lines for analog signaling nor a D channel for signaling which is routed to a fixed subscriber concentrator which is arranged upstream of a switching office. In the prior art, it is not possible for the signaling for connections between subscribers of a packet-switching communications network also to be carried out for voice connections between the subscribers using a conventional switching office of the circuit-switching communications network. If connection requests of telephone subscribers of a packet network are processed using a switching office or a server which makes available switching functions, the signaling is carried out via the packet network; i.e., the signaling data is transferred in a packet-oriented fashion.

Telephone subscribers in a packet-switching communications network are, for example, subscribers which are connected directly or via a dial-up connection to a network which is based on an Internet protocol. In addition to an Internet access, the subscriber also is provided with the voice services and/or facsimile services. These voice and/or facsimile services are intended to have the same scope of performance as is offered by conventional telephones and facsimile devices. The user data of such a subscriber are transmitted as data packets in accordance with an Internet protocol; for example, in accordance with what is known as the Transmission Control Protocol/User Datagram Protocol (TCP/UDP). Signaling information is transmitted in the packet-switching communications network using signaling packets in accordance with defined standards for example H.323, H.225, H.245, H.450 and SIP.

In packet-switching communications networks, signaling data and user data is transmitted on separate transmission paths. The user data is routed directly to the next subscriber. If it is necessary to convert the user data format, the user data of an interface unit is supplied to a conversion process; for example, a media gateway (MG). The signaling data is supplied, using signaling data packets, to a switching entity which controls connections.

The International Telecommunication Union (ITU) has defined, with its committee ITU-T, the H.323 Standard for data transmission in IP-based communications networks. The H.323 Standard provides and defines components, such as terminals, gateways, gatekeepers and multipoint control units, which are involved in such a connection. A H.323 terminal corresponds to the subscriber of the packet-switching communications network. Gateways are then used if the connection has to be routed via, for example, a public telephone network or if one party to the call is a subscriber connected to a switching office of the public telephone network. Multipoint control units are provided in order to set up conferencing circuits, for example.

The gatekeeper is the central component involved in the connection setup. It can be regarded as a switching office in the packet-switching communications network. The gatekeeper provides its zone with functions which serve, inter alia, for performing access monitoring, signaling, connection control and toll metering. The gatekeeper is also used for the call number assignment (E.164) to the subscriber address which is valid for the subscriber of the packet-switching communications network, the assignment (E.164) being necessary for access to the public telephone network. In a communications network which is based on the Internet protocol, what is referred to as an IP network, the address of the subscriber is the IP address. Thus, the gatekeeper is not a switching office of a public telecommunications network but rather a control unit in the IP-based communications network. Such a control unit is, for example, a server.

If network operators of circuit-switching communications networks also want to provide subscribers of packet-switching communications networks with communications services. In order to acquire new customers, these network operators must purchase novel technical equipment. This novel technical equipment has properties which are different from those of conventional switching offices; for example, with respect to the failure characteristics and performance, other standards of operation and toll metering and other manufacturers. As a result, the network operator incurs not only considerable procurement costs but also additional operating costs; for example, for instructing operating personnel. The high level of availability of the novel technical equipment and the implementation of both service features and features such as known toll metering standards can be achieved only with considerable financial outlay, if at all.

If a conventional switching office of a circuit-switching communications network is to carry out the connection control or the processing of signaling data for subscribers of a packet-switching communications network, the packet-network-specific signaling methods which are relevant to the subscriber signaling must be implemented in the switching office. Furthermore, signaling access to the packet-switching communications network must be implemented in the switching office, and software access to the subscribers of the packet-switching communications network must be ensured. These completely novel requirements of a conventional switching office require costly adaptation and restructuring of hardware components and software components. Considerable development expenditure is necessary to carry out these changes and restructuring operations.

An object of the present invention, therefore, is to disclose a method and a network element which easily use a network element of a circuit-switching communications network for performing subscriber signaling of subscribers of a packet-switching communications network.

SUMMARY OF THE INVENTION

Accordingly, pursuant to the method of the present invention, a conventional concentrator interface is installed in the network element which is, for example, a switching office of a circuit-switching communications network. Such a method ensures that the expenditure in order to change the software of the network element is low and that few internal interfaces of the switching office are affected by the changes. Conventional switching offices which are used as a network element in circuit-switching communications networks generally have a high level of availability, for example via redundancy, as a result of which faults and failures of subscriber lines rarely occur. By virtue of the use of such a switching office for processing signaling data and for controlling connections of subscribers of a packet-switching communications network, the subscribers also have a high level of availability of communications services.

The method according to the present invention also makes it easily possible to exchange signaling data between a subscriber of a packet-switching communications network and a switching office of a circuit-switching communications network. Thus, the transmission of the user data can be controlled via the switching office. Toll metering in accordance with the requirements which are customary in telecommunications networks easily can be carried out. The method can be used to perform the control both for connections in which the user data is routed via the switching office and for connections in which the user data is transmitted directly to the subscribers; for example, using the packet-switching communications network.

The subscriber of the packet-switching communications network also can be addressed unambiguously by subscribers of circuit-switching communications networks. The method according to the present invention can simultaneously be used to set up a number of connections to a subscriber of the packet-switching communications network. The switching office according to the present invention can be used by the subscriber of the packet-switching communications network to form a group with other subscribers of the packet-switching communications network and/or with subscribers of the circuit-switching communications network. Further service features and/or features are available within the group to the subscribers of the group. Such a group may be, for example, a CENTREX group, which is also referred to as a CENTREX business group.

The signaling data and the connection control of the subscriber of the packet-switching communications network also can be processed on the basis of the features which are known for a basic access line of a circuit-switching communications network or the features which are known for a primary rate access of a circuit-switching communications network. It is, thus, also possible to treat the subscribers of the packet-switching communications network as extensions. The switching office can then provide the subscriber of the packet-switching communications network with service features and/or features which are possible in circuit-switching communications networks.

The installation and setting up of a concentrator interface in a switching office make available subscriber-related data memories in the central units of the switching office and in peripheral units of the switching office; for example, in the line trunk groups. Properties of the subscribers which are assigned to the concentrator interface are stored in these data memories. Such properties are, for example, call number, type of connection, availability of features, barring information, group membership to CENTREX, etc. Furthermore, switching resources, for example processor capacity, signaling termination capacity and telecommunications routing capacity are made available for the subscribers assigned to the concentrator interface.

The signaling data which is generated in the peripheral units of the switching office for performing subscriber signaling of the subscribers of the packet-switching communications network is routed to a packet control unit which is connected, for example, directly to the packet-switching communications network and converts the signaling data for performing subscriber signaling of the subscribers of the packet-switching communications network into signaling packets of the packet-switching communications network. The administration and status changes, for example in the event of failure and re-availability of the concentrator interface for subscribers of the packet-switching communications network, take place in the same manner as in the case of concentrator interfaces to which subscribers of the circuit-switching communications network are connected. As a result of the processing of signaling data and the connection control using a conventional switching office, a gatekeeper with a switching function is not necessary. The function of storing the current accessibility of a packet-based subscriber in the packet network and the assignment of its switching address, i.e. its E.164 call number, to its possibly temporary address in the packet network can be carried out by servers arranged upstream of the switching office. These servers simultaneously assume the function of access monitoring (GK-RAS) and the function of a fire wall with respect to the packet network.

Pursuant to the method according to the present invention, manufacturers of switching offices for circuit-switching communications networks also can provide a solution for processing signaling data and for controlling connections of subscribers of packet-switching communications networks with low development expenditure. Such a switching office can be used, when the switching office is connected to a circuit-switching communications network and to a packet-switching communications network, to control the connections both of subscribers of the circuit-switching communications network and of subscribers of the packet-switching communications network.

Also via the method according to the present invention, already existing circuit-switching switching offices of the manufacturer can be used via the method for additionally, or exclusively, controlling connections of subscribers of packet-switching communications network; i.e., the switching offices present at the network operator's premises can be appropriately updated at the network operator's premises by the manufacturer. Investment in new technical equipment and in training the operating and maintenance personnel is low. When the subscriber signaling changes, for example when new service features or features are introduced, the network operator only has to adapt one switching system. Conventional network operators can, thus, make available communications services of public circuit-switching communications networks to packet-based subscribers in a greatly expanded market segment without a large amount of investment expenditure. The reliability, toll metering, subscriber administration and maintenance and servicing of the switching office are provided, or are possible, even when subscribers of packet-switching communications networks are connected, in the same way as with a conventional switching office. If two packet-based subscribers are involved in one connection, their user data stream can be routed in the packet network without media conversion, as a result of which there is no degradation of the voice quality.

Additional features and advantages of the present invention are described in, and will be apparent from, the Detailed Description of the Preferred Invention and the Figures.

DETAILED DESCRIPTION OF THE INVENTION

FIG. 1 illustrates a typical structure of a conventional switching system using a block circuit diagram. Such a switching system has a switching network SN, a message router MB, a coordination processor CP, operator devices NC, backup memory MD and protocol terminating devices CCNC (for example, in accordance with signaling system No. 7). These elements of the switching system are configured redundantly, i.e. doubly, for example, in order to increase protection against failure. The switching system also has line trunk groups LTG which are connected to the switching network SN and the message router system. The line trunk groups LTG are also referred to as peripheral units of the switching system and are used to connect subscribers and connecting lines and for connecting concentrator interfaces which can be used to connect separately arranged connecting units, for example. If no increased requirements are made of the switching availability of both the subscribers and connecting lines of the switching system, the trunk line groups LTG are not redundantly configured.

Figure 2:
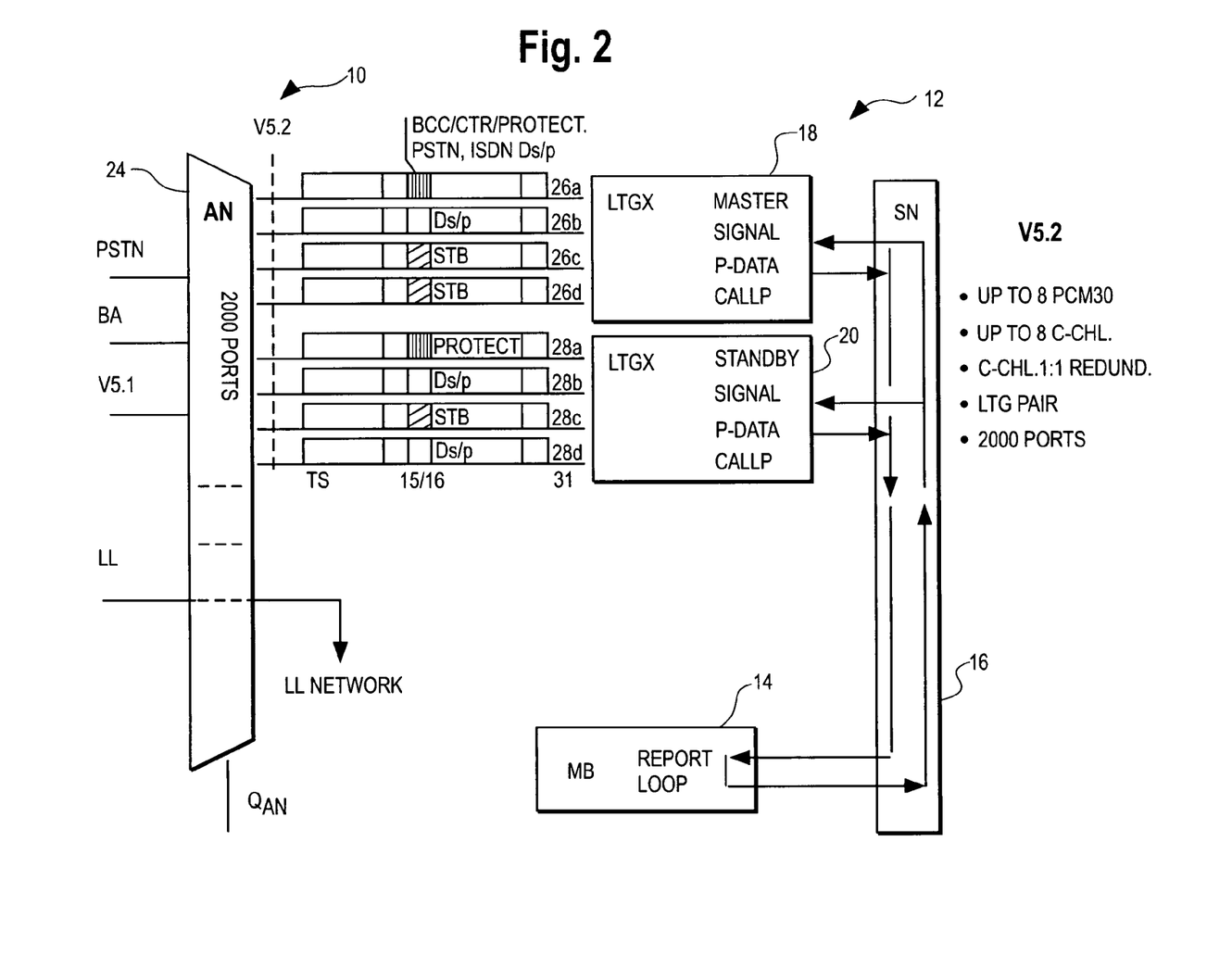
FIG. 2 shows a concentrator interface of the type V5.2 which is connected to a known switching office.

FIG. 2 illustrates a concentrator interface 10, a switching office 12 and units of the switching office. The switching office 12 has a message router system 14, a switching network 16 and trunk line groups 18, 20. The concentrator interface 10 has a local exchange area 24 which is connected to the line trunk groups 18, 20 using eight PCM links 26a to 26d, 28a to 28d. A subscriber line concentrator which is connected via the concentrator interface 10 is also referred to as an access network (AN). The PCM links 26a to 26d, 28a to 28d are used to transmit both user data and signaling and control data between the line trunk groups 18, 20 and the subscriber line concentrator. The data which are used for subscriber signaling and for transmitting control information and messages are transmitted using channels of the concentrator interface 10.

The signaling channels and control channels have, for example, a data transmission capacity of 64 kbit/s and are routed in the PCM links 26a to 26d, 28a to 28d between the trunk line groups 18, 20 and the subscriber line concentrator. If a large signaling and control data volume is expected at the concentrator interface 10, the concentrator interface 10 may include a number of signaling channels and control channels.

Within the scope of the setting up, configuration and putting into service of the concentrator interface 10 in the switching office 12, subscriber-related data memories are made available for the concentrator interface 10 in the central units of the switching office 12 and in the line trunk groups 18, 20. The properties of the subscribers connected via this concentrator interface 10 are stored in these data memories. Furthermore, switching resources, for example processor capacity, signaling termination capacity, and message transfer capacity for the subscribers connected via the concentrator interface 10, are provided by setting up, configuring and putting into service the concentrator interface 10.

The subscribers which can be connected via the concentrator interface 10 may be subscribers with an ISDN basic access, an ISDN primary rate access or an analog subscriber line. Both main lines and extensions are possible. Such a concentrator interface 10 enables a restricted subscriber number, for example 2000 subscribers, to be connected, the number being determined by the assigned line trunk groups. The concentrator interface 10 includes, for example, eight PCM30 links, containing a total of eight signaling and control channels. The concentrator interface 10 is an example of a V5.2 interface. For a more detailed functional description, reference should be made to the Standard ETS 300 347 for this interface.

Figure 3A:
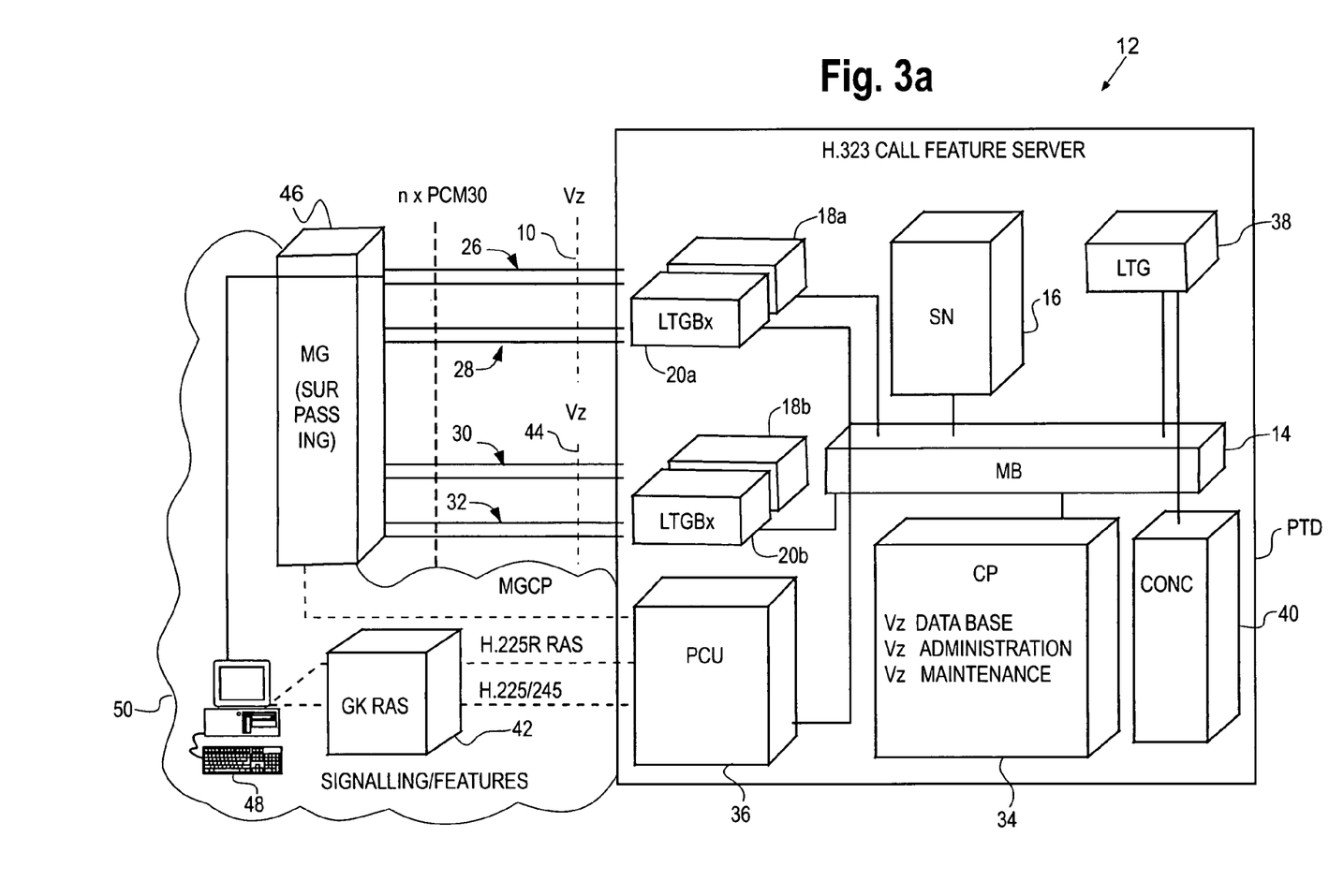
FIG. 3a shows a switching office for carrying out the method according to the present invention.

FIG. 3a illustrates a switching office 12 which has line trunk groups 18a, 20a by means of which a concentrator interface 10 is actuated. Line trunk groups 18b, 20b are used to actuate a second concentrator interface 44. The line trunk groups 18a, 18b, 20a, 20b are connected to the message router system 14 of the switching office 12. The message router system 14 of the switching office 12 is also connected to the switching network 16 of the switching office, a communications processor 34 and a protocol terminating device 40 which may be, for example, a protocol terminating device of the signaling system No. 7. The message router system 14 is also connected to a packet control unit 36.

The concentrator interface 10 includes eight PCM30 links. In each case four of the eight PCM30 links are connected to the line trunk groups 18a, 20a, of which in each case, only two PCM30 links are illustrated in FIG. 3a. The concentrator interface 44 also includes eight PCM links. These four PSM links, in each case four PCM30 links 30, 32, are connected to the line trunk groups 18b, 20b, only two being illustrated in each case. The PCM30 links 26, 28 are routed to a media gateway 46. The PCM30 links 30, 32 are also routed to the media gateway 46. The media gateway 46 forms an interface between the circuit-switching communications network and a packet-switching communications network 50. A subscriber 48 is a subscriber of the packet-switching communications network 50. The packet-switching communications network 50 is an IP network. The subscriber 48 is set up at the concentrator interface 10.

The coordination processor 34 and further central units of the switching office 12 provide the concentrator interfaces 10, 44 with, in particular, memory locations in the database of the switching office 12, computational capacity and signaling capacity for subscriber signaling, for subscriber administration and for servicing and maintenance of the concentrator interface 10, 44 and of the subscriber lines which are connected via these interfaces 10, 44. When there is a connection between the subscriber 48 and a further IP-based subscriber setup at the concentrator interface 44, the user data of the terminal of the subscriber 48 are supplied to the media gateway 46 using the IP network 50. The subscriber 48 transmits the user data here as data packets to the media gateway 46.

The media gateway 46 converts these data packets into data of the circuit-switching communications network of the switching office 12 and transmits them to the line trunk groups 18a, 20a using the PCM30 links 26, 28. This user data is transmitted by the line trunk groups 18a, 20a using connections (not illustrated) between the line trunk groups 18a, 20a and the switching network 16. The switching network 16 switches the connection to the other subscriber which is set up at the concentrator interface 44. The user data of the subscriber 48 is transmitted from the switch network 16 to one of the line trunk groups 18b, 20b. The PCM30 links 30, 32 are used to transmit this data from the line trunk groups 18b, 20b via the concentrator interface 44 to the media gateway 46 which converts this data into data packets which are routed to the other subscriber using the IP network 50.

The transmission of the user data of the other subscriber in the direction of the subscriber 48 is correspondingly reversed. The other subscriber also can be a subscriber of the circuit-switching communications network which can be accessed, for example, via a further line trunk group 38 of the switching office 12. If the subscriber is a subscriber of another switching office of the circuit-switching communications network, the data is transmitted between the other switching office and the switching office 12 using the circuit-switching communications network. The further subscriber can, however, also be another subscriber of the packet-switching communications network which is connected to the switching office 12 or to another switching office via the media gateway 46 or another media gateway.

In the case of the switching office 12, the signaling data for performing subscriber signaling are not transmitted from the line trunk groups 18a, 18b, 20a, 20b to time slots of the PCM links or from communications channels routed in the PCM links to the line trunk groups 18a, 18b, 20a, 20b, as is known when concentrator interfaces 10, 44 are connected to conventional subscribers. The signaling information for performing subscriber signaling is exchanged between the line trunk groups 18a, 18b, 20a, 20b and the packet control unit 36 via the message router system 14. The packet control unit 36 performs here the coordination of the control of the media gateway 46 and the conversion of the subscriber signaling of the subscriber 48 to the signaling method H.323 used in the IP network 50 by the subscriber 48. The connection between the packet control unit 36 and media gateway 46 for controlling the media gateway 46 is illustrated via a dotted line. The subscriber signaling of the subscriber 48 is carried out via a gatekeeper 42 which is connected to the packet control unit 36. The connection between the packet control unit 36 and the gatekeeper 42 is illustrated by two dashed lines, the subscriber signaling being carried out between the packet control unit 36 and the gatekeeper 42 as well as between the gatekeeper 42 and the subscriber 48 using the H.225/H.245

Standard. The gatekeeper 42 provides an access monitoring function and a firewall function.

Figure 3B:
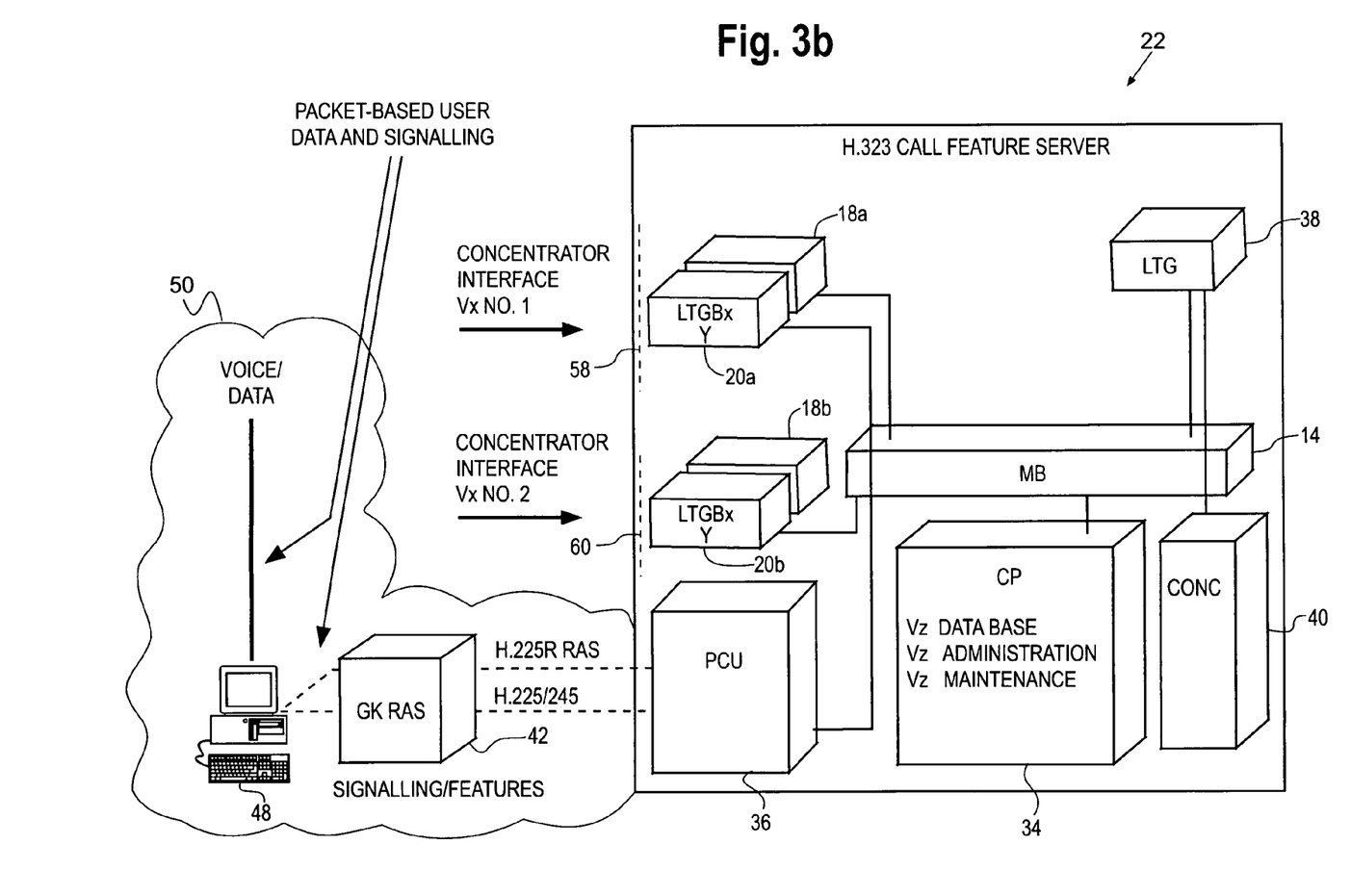
FIG. 3b shows a second switching office for carrying out the method according to the present invention.

FIG. 3b shows a second switching office 22 which is similar to the switching office 12 illustrated in FIG. 3a. The switching office 22 has, in contrast to the switching office 12 in FIG. 3a, no switching network for switching user data connections. The user data signaling and the connection control are performed using the switching office 22 in the same way as has already been described for the switching office 12 in FIG. 3a. The switching office 22 has a first concentrator interface Vx 58 and a second concentrator interface Vx 60 which, in contrast to the concentrator interfaces 10 and 44 in FIG. 3, do not have any PCM links. In the exemplary embodiment according to FIG. 3b, the user data is transmitted or routed exclusively via the IP network 50.

Figure 4:
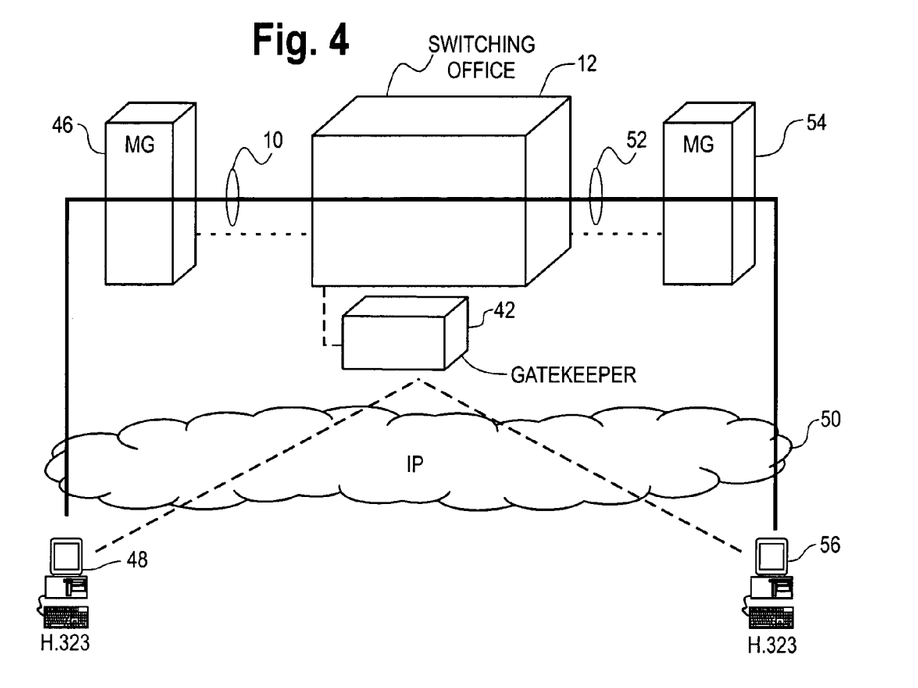
FIG. 4 shows two subscribers of a packet-switching communications network whose signaling data is processed using the method according to the present invention, the user data being routed via the switching office which processes the signaling data.

FIG. 4 illustrates an arrangement in which the switching office 12 switches a voice connection between the subscriber 48 and a further subscriber 56. Both the subscriber 48 and the subscriber 56 are connected via the IP network 50. The media gateway 46 is connected to the switching office 12 using PCM links via the concentrator interface 10. A media gateway 54 is connected to the switching office 12 using PCM links via a concentrator interface 52. Both media gateways 46, 54 are connected to the IP network 50. The user data for the voice connection between the subscriber 48 and the subscriber 56 is transmitted between the subscriber 48 and the media gateway 46 as well as between the media gateway 54 and the subscriber 56 using data packets. The media gateways 46, 54 convert these data packets into data of a circuit-switching communications network and transmit them between the media gateways 46 and 54 via the interfaces 10 and 52 to the switching office 12 using the PCM links.

The switching network 16 of the switching office 12 switches a connection for transmitting this user data. The signaling data for performing subscriber signaling is exchanged with the packet control unit 36 via the message router system 14. The packet control unit 36 has, in each case, a connection to the media gateway 46 and to the media gateway 54, which connection is indicated by dotted lines in FIG. 4. As already described in FIG. 3a, the packet control unit 36 controls the media gateway 46, 54. The subscriber signaling is transmitted on an IP basis from the packet control unit 36 of the switching office 12 to the gatekeeper 42. FIG. 4 illustrates this transmission using a dashed line. The gatekeeper 42 transmits the subscriber signaling data of the subscriber 48 and the subscriber signaling data of the subscriber 56 using the IP network 50. This transmission between the gateway 52 and the subscribers 48, 56 is also illustrated in each case by a dashed line. In this way, with the method according to the present invention, the signaling information for performing subscriber signaling is no longer routed via the PCM links of the concentrator interfaces 10, 52. The subscriber signaling is instead routed via the packet control unit 36 which both controls the media gateways 46, 54 and converts the subscriber signaling to the requirements of the subscribers 48, 56 of the IP network 50, for example to H.323 or SIP signaling, and outputs it. In addition, it conversely converts the IP based subscriber signaling to the signaling standard of the concentrator interface 10, 52 and forwards it to the respective line trunk group.

In the database of the switching office 12, the subscribers 56, 48 are introduced as subscribers of a new type. These subscribers can be assigned properties of an ISDN basic access or of an ISDN extension. However, the subscribers of the packet-switching communications network in the database are characterized in such a way that they can be connected only to concentrator interfaces 10, 44, 52 at which the subscriber signaling of the subscribers 56, 48 assigned to them is carried out directly via a packet control unit 36. The setting up of the subscribers 48, 56 in the database of the switching office 12 enables the subscribers 48, 56 to be provided with features of main lines and extensions. It is not possible to connect any conventional subscribers of the circuit-switching communications network to the concentrator interfaces 10, 44, 52 because direct subscriber signaling routed via the time slots of the assigned PCM30 links no longer takes place via these interfaces 10, 44, 52. Therefore, these concentrator interfaces 10, 44, 52 also can be referred to as virtual concentrator interfaces.

These interfaces 10, 44, 52 are also labeled in the database of the switching office 12 so that conventional subscribers of the circuit-switching communications network cannot be connected to these interfaces 10, 44, 52. Administrative checking takes place both during the configuration of the interfaces 10, 44, 52 and during the setting up and configuration of the subscribers 48, 56, ensuring that conventional subscribers cannot be connected to the interfaces 10, 44, 52 and that the subscribers 48, 56 are assigned only to interfaces 10, 44, 52 which support the method according to the present invention for connecting subscribers 48, 56 of a packet-switching communications network 50.

The routing of the user data stream via the switching office 12 permits voice processing, in particular of tones, announcements, dialogues and dual-tone signals which can be fed in and/or processed conventionally via the switching office. In order to install and control the gateways 46, 54, use is made in particular of events which arise in the line trunk group of the switching office 12 which is actively switching and which relate to the through-connection of a time slot of a PCM link assigned to the concentrator interface 10, 52 to a subscriber channel of the subscriber 48, 50. The start and end of such an assignment are transmitted by the line trunk group 18a, 18b, 20a, 20b to the packet control unit 36 and they bring about the appropriate setting of the gateway 46, 54 and terminal of the subscriber 48, 50.

Figure 5:
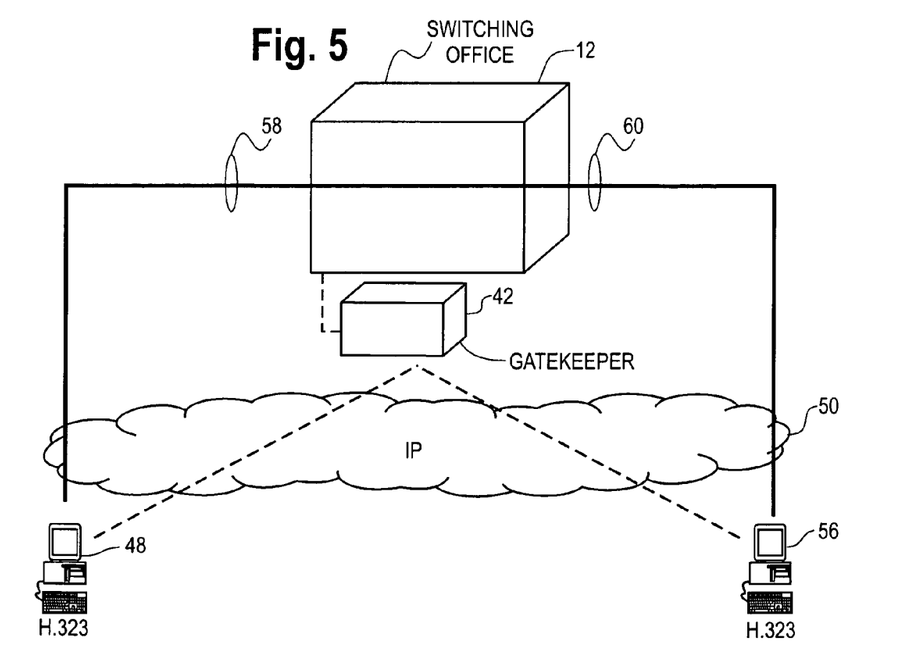
FIG. 5 shows two subscribers of a packet-switching communications network whose signaling data is processed using the method according to the present invention, the user data not being routed via the switching office which processes the signaling data.

FIG. 5 illustrates a further arrangement for processing signaling data and for controlling connections of subscribers 48, 56 which are connected via the IP network 50. In the exemplary embodiment illustrated in FIG. 5, the user data between the subscriber 48 and the subscriber 56 is not routed via the switching office 12, but instead transmitted directly via the IP network 50. The media gateways 46 and 54 are not required for such a connection between the subscriber 48 and the subscriber 56. It is also possible to dispense with the PCM30 links of the concentrator interface 10 at the line trunk groups 18a, 20a because no user data is to be transmitted via the line trunk groups 18a, 20a. The same applies to the concentrator interface 52.

In the database of the switching office 12, the subscriber 48 is assigned to the concentrator interface 10, and the subscriber 56 to the concentrator interface 52. This is indicated by the thin unbroken connecting line between the interface 10 and the subscriber 48 as well as between the interface 52 and the subscriber 56. The subscriber signaling of the subscribers 48, 56 takes place as already described in FIG. 4. In the exemplary embodiment illustrated in FIG. 5, the packet control unit 36 of the switching office 12 also supplies the signaling data to the gatekeeper 42. The gatekeeper 42 has the same functionality as the gatekeeper described in the exemplary embodiment in FIG. 4.

As already mentioned in the description relating to FIG. 4, the concentrator interfaces 10, 44, 52 and the subscribers

48, 56 are labeled in the database of the switching office 12. The labeling of the concentrator interface 10, 44, 52 permits the software of the line trunk groups 18a, 18b, 20a, 20b to dispense with actions which are no longer appropriate when connecting subscribers 48, 56 of packet-switching communications networks 50. In particular, the activation of the control channels and signaling channels of the concentrator interface 10, 44, 52 is prohibited. The putting into service of the PCM links 26, 28, 30, 32 assigned to the concentrator interfaces 10, 44, 52 also can be prohibited, something which is necessary in the present exemplary embodiment. However, the availability of the functions which are no longer required and the completion of functions which are no longer required is signaled to the central parts of the switching office 12 in order to avoid undesired or inappropriate incorrect reactions and in order to keep the adaptation outlay in the central parts of the switching office 12 low. In addition, for the sake of simplification, attributes which are indispensable for the switching office 12 but are not relevant to these concentrator interfaces 10, 44, 52 can be generated automatically on the operator interface of the system and therefore do not need to be fed in by an operator via the operator interface of the switching office 12.

The switching office 12 can be used to access the subscribers 48, 56 using a call number of a circuit-switching communications network, for example a call number in accordance with E. 164, via the IP network 50. The function of storing the current accessibility of the subscriber 48, 56 of the IP network 50 and assigning its call number to an address in the IP network 50 can be carried out either using the database of the switching office 12 or with control units which are connected to the switching office 12. Such control units can be servers, for example. The packet control unit 36 uses this control unit to determine the subscriber addresses of the subscriber 48 and of the subscriber 56 in the IP network 50 by reference to the E.164 call number, and thus determines its availability for seizure by another subscriber; i.e., for a B-end seizure. In the case of an A-end seizure, the A call number is converted to the concentrator interface which is responsible for the subscriber, the line trunk group which is responsible for switching at the A end being selected. The server function above has been referred to as GK-RAS within the framework of the exemplary embodiment in FIGS. 3a and 3b.

In other exemplary embodiments it is also possible for the concentrator interface 10, 44, 52, 58, 60 to include SDH links.

Although the present invention has been described with reference to specific embodiments, those of skill in the art will recognize that changes may be made thereto without departing from the spirit and scope of the invention as set forth in the hereafter appended claims.

The invention claimed:

1. A method for processing signaling data and for controlling connections in a packet-switching communications network, wherein the packet-switching communications network includes at least one subscriber, the method comprising the steps of:
   controlling a concentrator interface via a network element, using at least one connecting unit such that the network element makes resources available to said concentrator interface;
   transmitting signaling data between at least one packet control unit of the network element and the connecting unit of the network element via a message distribution system of the network element;
   converting the signaling data of the network element by the packet control unit into signaling packets of the packet-switching communications network and vice versa;
   exchanging the signaling packets of the subscriber of the packet-switching communications network between subscribers and the network element using a physical interface of one of the packet control unit and the message router system of the network element, and
   transmitting the user data using the network element when there is a connection between the subscriber and a second subscriber.

2. The method for processing signaling data and for controlling connections in a packet-switching communications network as claimed in claim 1.

3. The method for processing signaling data and for controlling connections in a packet-switching communications network as claimed in claim 1, the method further comprising the steps of:
   administering and operating the subscriber in the network element as a subscriber which is connected using the concentrator interface; and
   using the resources made available to the concentrator interface for the subscriber.

4. The method for processing signaling data and for controlling connections in a packet-switching communications network as claimed in claim 1, wherein functions of one of a main line and an extension are available to the subscriber in the network element.

5. The method for processing signaling data and for controlling connections in a packet-switching communications network as claimed in claim 1, wherein the concentrator interface is administered and operated as at least one of a V5.2 interface, a TR303 interface, a V93 interface and a V95 interface.

6. The method for processing signaling data and for controlling connections in a packet-switching communications network as claimed in claim 1, the method further comprising the step of:
   bidirectionally transmitting, via one of PCM connections and SDH connections of the concentrator interface, user data to an interface unit which converts the user data between a format which is customary in the packet-switching communications network and a format which is customary in the circuit-switching communications network.

7. The method for processing signaling data and for controlling connections in a packet-switching communications network as claimed in claim 6, wherein the interface unit is a media gateway which converts the user data bidirectionally between packet format and TDM format.

8. The method for processing signaling data and for controlling connections in a packet-switching communications network as claimed in claim 6, the method further comprising the step of:
   controlling the interface unit via line trunk groups of the network element which control the concentrator interface.

9. The method for processing signaling data and for controlling connections in a packet-switching communications network as claimed in claim 1, the method further comprising the step of:
   characterizing the concentrator interface in a database of the network element as a concentrator interface for connecting subscribers of the packet-switching communications network.

10. The method for processing signaling data and for controlling connections in a packet-switching communications network as claimed in claim 1, the method further comprising the step of:
routing the subscriber in a database of the network element as a subscriber of the packet-switching communications network.

11. The method for processing signaling data and for controlling connections in a packet-switching communications network as claimed in claim 10, wherein the concentrator interface for connecting subscribers of the packet-switching communications network can be assigned only subscribers which are subscribers of the packet-switching communications network.

12. The method for processing signaling data and for controlling connections in a packet-switching communications network as claimed in claim 1, wherein at least one of functions of the concentrator interface for connecting subscribers of the packet-switching communications network which are not required are deactivated, and messages of the functions are suppressed in the network element.

13. The method for processing signaling data and for controlling connections in a packet-switching communications network as claimed in claim 1, wherein subscribers of the circuit-switching communications network are assigned to only one concentrator interface of the network element which is provided for connecting subscribers of the circuit-switching communications network.

14. The method for processing signaling data and for controlling connections in a packet-switching communications network as claimed in claim 2, wherein assignment of the subscribers to at least one the concentrator interfaces of the network element and connecting units of the network element is carried out in a database of the switching office using an operator interface of the network element.

15. The method for processing signaling data and for controlling connections in a packet-switching communications network as claimed in claim 1, the method further comprising the step of:
actuating, via the network element, a plurality of concentrator interfaces to which a respective plurality of subscribers can be assigned.

16. The method for processing signaling data and for controlling connections in a packet-switching communications network as claimed in claim 1, the method further comprising the step of:
assigning a call number to the subscriber in the network element, wherein the subscriber in the packet-switching communications network has a subscriber address, and the assignment between the subscriber address and the call number is made using a control unit.

17. The method for processing signaling data and for controlling connections in a packet-switching communications network as claimed in claim 1, wherein the control unit is a data processing system which is assigned to the network element.

18. The method for processing signaling data and for controlling connections in a packet-switching communications network as claimed in claim 1, wherein the subscriber is administered as a subscriber with an ISDN basic access in the network element.

19. The method for processing signaling data and for controlling connections in a packet-switching communications network as claimed in claim 18, wherein the ISDN basic access is one of an ISDN basic access in point-to-point configuration or an ISDN basic access in point-to-multipoint configuration.

20. The method for processing signaling data and for controlling connections in a packet-switching communications network as claimed in claim 1, the method further comprising the step of:
transmitting the user data directly between the subscribers using the packet-switching communications network when there is a connection between the subscriber and a further subscriber of the packet-switching communications network.

21. The method for processing signaling data and for controlling connections in a packet-switching communications network as claimed in claim 1, wherein the packet-switching communications network is an Internet-protocol-based network.

22. The method for processing signaling data and for controlling connections in a packet-switching communications network as claimed in claim 1, wherein the signaling of the subscriber is carried out in accordance with one of the H.323 Standard and the SIP Standard.

23. A network element for processing signaling data and for controlling connections of subscribers of a packet-switching communications network, comprising:
a concentrator interface which is controlled using at least one connecting unit of the network element, the concentrator interface making available resources of the network element;
a packet-switching communications network with at least one subscriber;
a message router system of the network element having a physical interface; and
at least one packet control unit having a physical interface that connects the message router system to the connecting unit, wherein signaling data for subscriber signaling is transmitted between the packet control unit of the network element and the connecting unit of the network element via the message router system of the network element, and wherein the signaling data of the network element is converted into signaling packets of the packet-switching communications network by the packet control unit, and vice versa, and wherein signaling of the subscriber of the packet-switching communications network is exchanged between subscribers and the network element using a physical interference of one of the packet control unit and the message router system of the network element, and user data is transmitted using the network element when there is a connection between the subscriber and a second subscriber.

24. The network element for processing signaling data and for controlling connections of subscribers of a packet-switching communications network as claimed in claim 23, wherein the network element contains both units of a conventional switching office of a line-switching communications network and at least one packet control unit.

25. The network element for processing signaling data and for controlling connections of subscribers of a packet-switching communications network as claimed in claim 23, wherein the packet-switching communications network is an Internet-protocol-based network.

26. The network element for processing signaling data and for controlling connections of subscribers of a packet-switching communications network as claimed in claim 23, wherein the signaling of the subscriber is carried out in accordance with one of the H.323 Standard and the SIP Standard.

* * * * *